United States Patent
Liu et al.

(10) Patent No.: US 8,159,095 B2
(45) Date of Patent: Apr. 17, 2012

(54) HIDING STRUCTURE FOR POSITIONING SIGNAL CONVERSION MECHANISM OF A TORQUE MOTOR

(75) Inventors: Chin-Chia Liu, Taichung (TW); Chih-Yu Wang, Taichung (TW); Hsiao Shun-Hsing, Taichung (TW); Chi-Lu Li, Taichung (TW); Chih-Mao Shiao, Taichung (TW); Hsiang-Ju Wang, Taichung (TW)

(73) Assignee: Hiwin Mikrosystem Corp., Taichung (TW)

( * ) Notice: Subject to any disclaimer, the term of this patent is extended or adjusted under 35 U.S.C. 154(b) by 379 days.

(21) Appl. No.: 12/558,735

(22) Filed: Sep. 14, 2009

(65) Prior Publication Data

US 2011/0062810 A1   Mar. 17, 2011

(51) Int. Cl.
*H02K 37/14* (2006.01)

(52) U.S. Cl. .................................................. 310/68 B
(58) Field of Classification Search .................. 310/68 B
See application file for complete search history.

(56) References Cited

U.S. PATENT DOCUMENTS

| 6,081,056 | A  | * | 6/2000 | Takagi et al. | 310/89 |
| 6,424,061 | B1 | * | 7/2002 | Fukuda et al. | 310/49.11 |
| 6,693,422 | B2 | * | 2/2004 | Lutz | 324/207.2 |

* cited by examiner

*Primary Examiner* — Dang Le
(74) *Attorney, Agent, or Firm* — Guice Patents PLLC

(57) ABSTRACT

A hiding structure for positioning signal conversion mechanism of a torque motor, which includes a stator having a curvature center line, a rotor coaxially fitted with the stator, a positioning/detecting section disposed on the stator between the stator and the rotor for detecting movements of the motor and outputting corresponding analog signals and a signal conversion section for receiving the analog signals provided by the positioning/detecting section and converting the analog signals into digital signals and outputting the digital signals. The signal conversion section is fixed on an end face of one end of the stator in an insulated state.

8 Claims, 4 Drawing Sheets

HIDING STRUCTURE FOR POSITIONING SIGNAL CONVERSION MECHANISM OF A TORQUE MOTOR

BACKGROUND OF THE INVENTION

The present invention relates generally to a torque motor, and more particularly to a hiding structure for positioning signal conversion mechanism of a torque motor.

A torque motor is able to output greater start torque and has the characteristic of suspension. In a restrained state within the rotational speed-torque characteristic region or when operating at low speed, the torque motor can still keep a stable torque. Therefore, all kinds of torque motors have been widely applied in various fields including semiconductor mechanics, machining tools and positioning and transmission components of detection tables that necessitate constant tension rolling, restrained operation, static torque operation, etc.

However, the torque motor can simply output power, while failing to control the magnitude of the output power itself. Therefore, a motor driver is an important controlling means for the motor. In the modern industrial environment, motor controlling system has been developed from the early-stage analog type into the current digital type. By means of digital signal processing technique, the problems such as bias voltage, component aging and high liability to environmental interference that exist in the analog-type motor controlling system are avoided. Accordingly, the motor controlling system can be more flexibly and conveniently used.

However, the signal and magnetic flux generated by the motor are both bipolar. Therefore, the intermediate circuit must be constituted of analog components for converting voltage level. That is, the feedback analog signal generated by the motor must be first converted into digital signal by means of an analog-to-digital converter. The digital signal is then provided for the driver to process so as to control the voltage and current applied to the motor, whereby the motor can output power as desired.

In the conventional motor controlling system, the analog-to-digital converter is an independent component arranged outside the torque motor. Therefore, when the positioning signal detected inside the torque motor is output to the converter outside the torque motor in the form of analog signal, the signal is transmitted in a longer path. Accordingly, the analog signal is likely to be distorted. In this case, the digital signal will give incorrect data to the driver. This will result in misoperation of the torque motor to affect manufacturing process.

SUMMARY OF THE INVENTION

It is therefore a primary object of the present invention to provide a hiding structure for positioning signal conversion mechanism of a torque motor. By means of the hiding structure, the transmission path of the analog signals fed back by the motor is shortened to minimize the possibility of distortion of the analog signals due to external affection.

To achieve the above and other objects, the hiding structure for positioning signal conversion mechanism of the torque motor of the present invention includes a stator having a curvature center line, a rotor coaxially fitted with the stator, a positioning/detecting section disposed on the stator between the stator and the rotor for detecting movements of the motor and outputting corresponding analog signals and a signal conversion section for receiving the analog signals provided by the positioning/detecting section and converting the analog signals into digital signals and outputting the digital signals. The signal conversion section is fixed on an end face of one end of the stator in an insulated state.

The present invention can be best understood through the following description and accompanying drawings wherein:

DETAILED DESCRIPTION OF THE PREFERRED EMBODIMENTS

Figure 1:
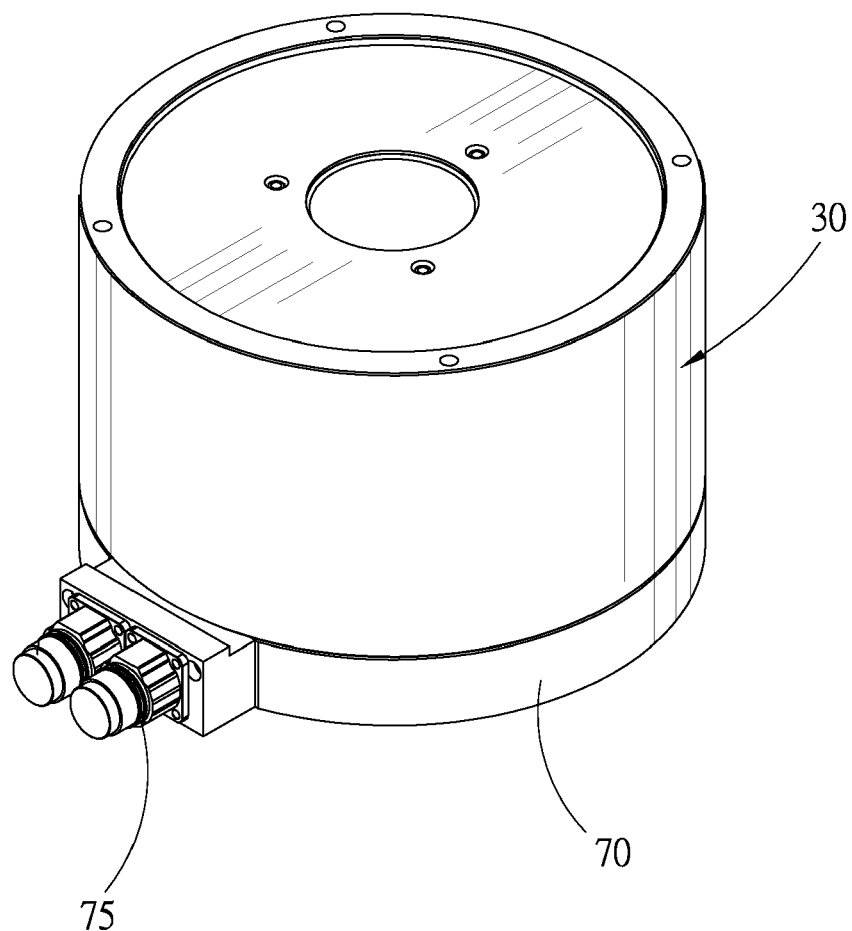
FIG. 1 is a perspective view of a preferred embodiment of the present invention.
Figure 2:
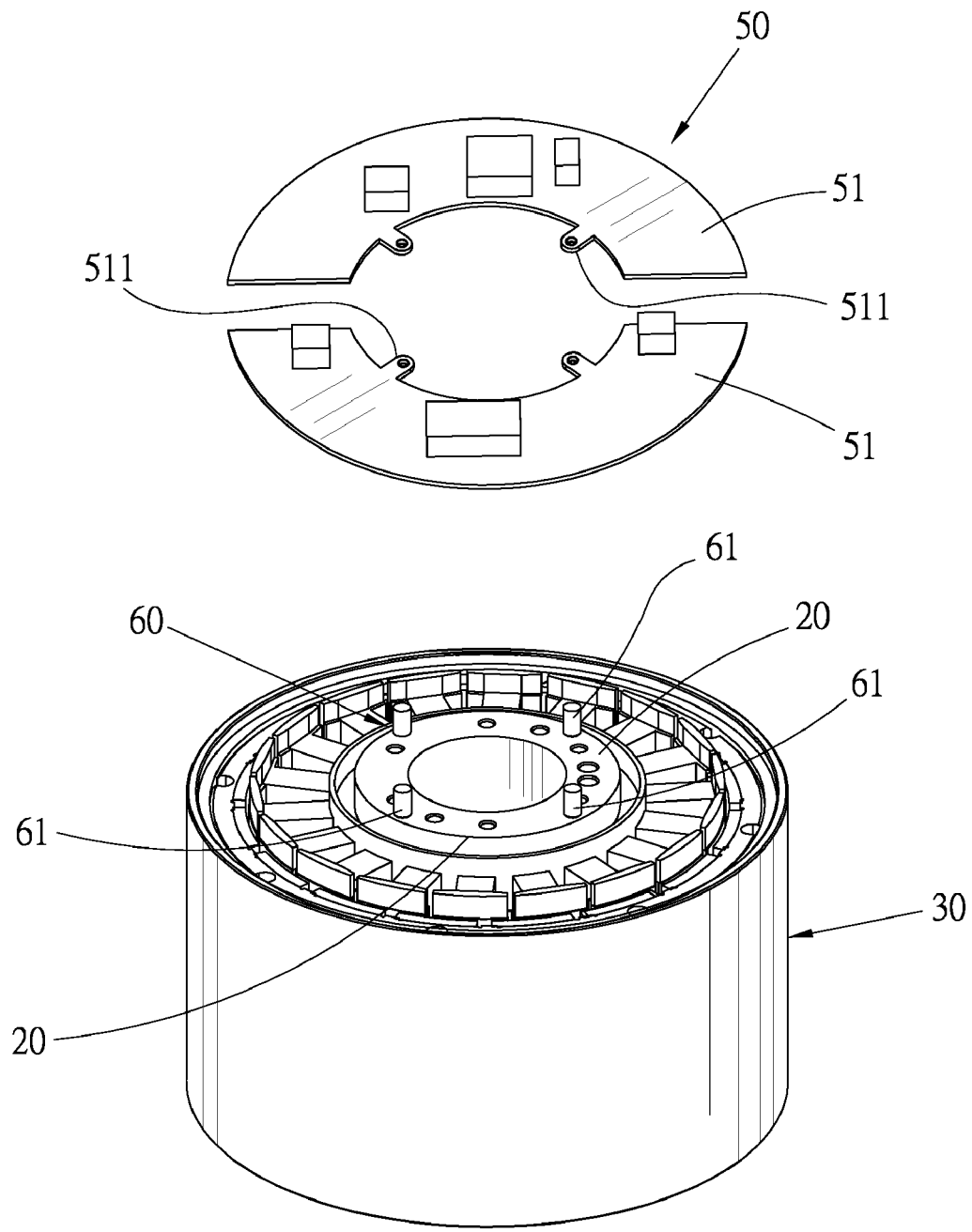
FIG. 2 is a perspective partially exploded view of the preferred embodiment of the present invention.
Figure 3:
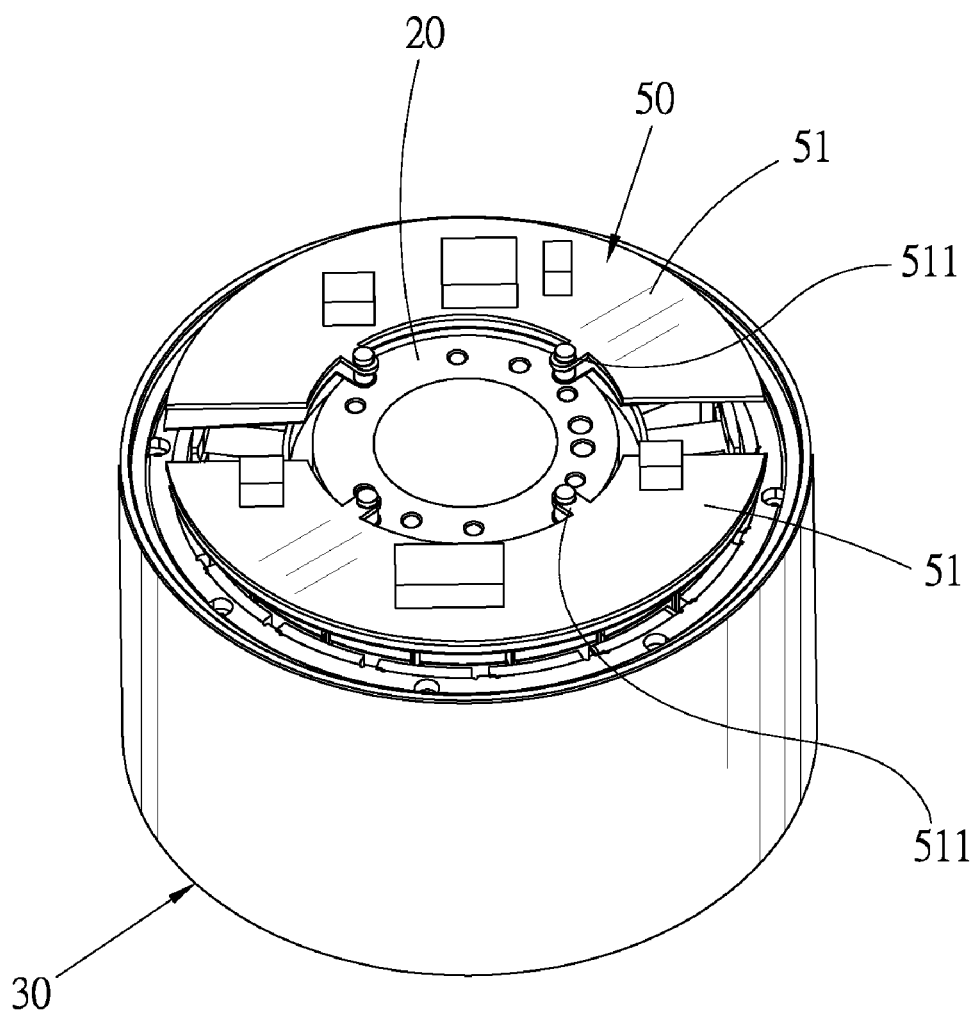
FIG. 3 is a perspective assembled view of the preferred embodiment of the present invention.
Figure 4:
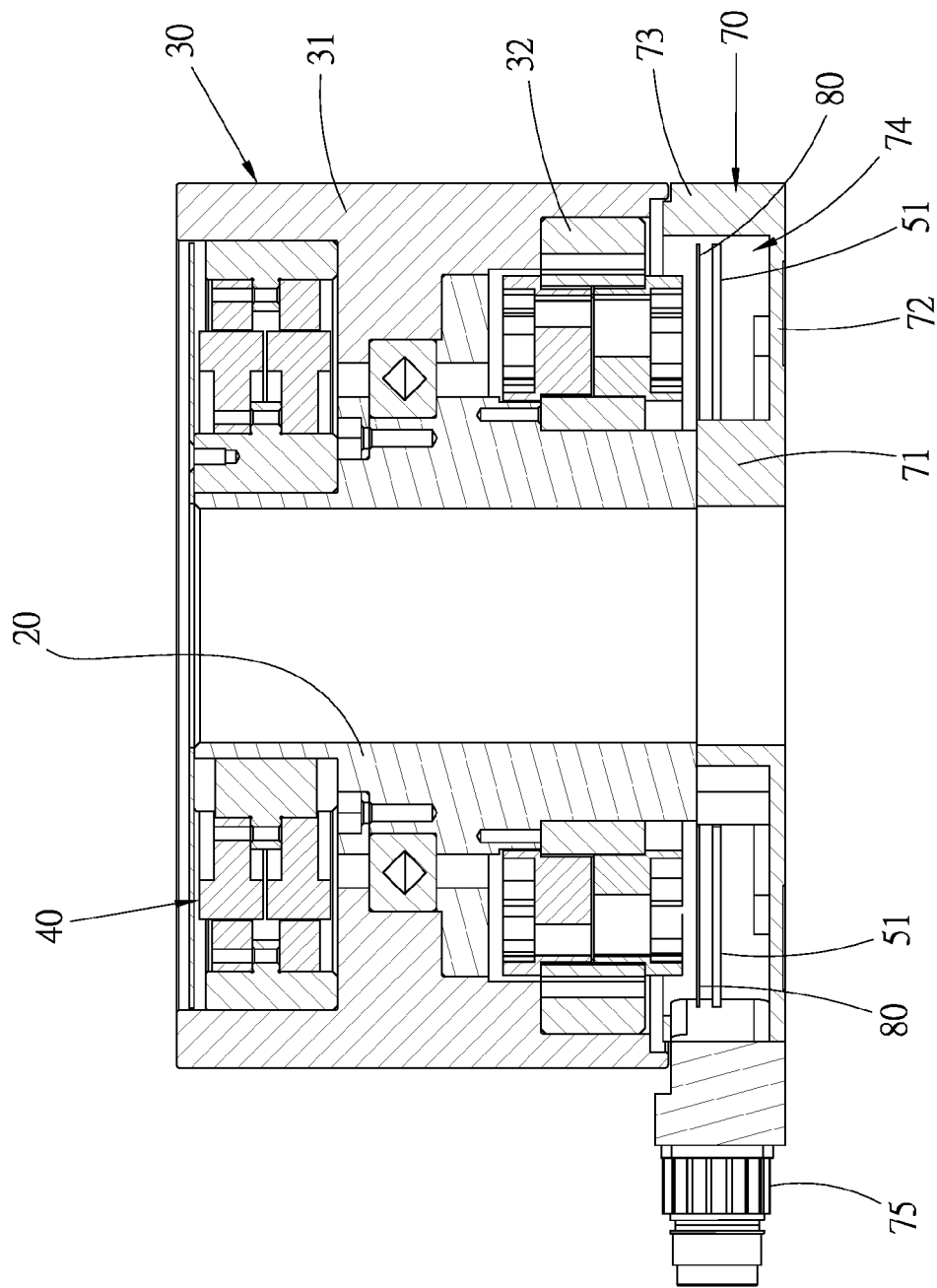
FIG. 4 is a sectional view of the preferred embodiment of the present invention.

Please refer to FIGS. 1 to 4. According to a preferred embodiment, the hiding structure 10 for positioning signal conversion mechanism is applied to an outer rotor torque motor, including a stator 20, a rotor 30, a positioning/detecting section 40, a signal conversion section 50, a pad section 60, an end seat 70 and two insulating plates 80.

The stator 20 is a substantially straight tubular inner stator. The rotor 30 is an annular rotary member coaxially fitted around the stator 20. Through the effect of electromagnetic field, the rotor 30 can be driven to rotate about a curvature center line of the stator 20 to output mechanical power. The above basic arrangement pertains to well known motor techniques and thus will not be further described hereinafter.

The rotor 30 is an annular outer rotor composed of an annular outer rotor seat 31 and multiple magnets 32 fixed on inner circumference of the outer rotor seat 31. The magnets 32 are arranged in an annular pattern having a curvature center line coinciding with the curvature center line of the stator 20. When the magnetic field of the stator 20 varies and acts on the magnets 32, the rotor 30 is rotated to output mechanical power as in the prior art.

The positioning/detecting section 40 is positioned between the inner circumference of the outer rotor seat 31 and outer circumference of the stator 20 for detecting the movements of the motor, including operation and disoperation. The positioning data such as relative position, voltage and current are bed back to the signal conversion section 50 in the form of analog signals. The detecting technique is also not included in the scope of the present invention and thus will not be further described hereinafter.

The signal conversion section 50 is an analog-to-digital converter for converting the analog signals obtained from the positioning/detecting section 40 into digital signals. In this embodiment, the signal conversion section 50 is composed of two symmetrical arced circuit boards 51. The analog-to-digital circuits are collectively arranged on the circuit boards 51. Each circuit board 51 has a pair of fixing lugs 51 extending from an inner arced edge of the circuit board 51.

There are many types of conventional analog-to-digital converters for converting analog signals into digital signals, such as digital-ramp ADC, successive approximation ADC, flash ADC and tracking ADC. All these analog-to-digital converters can be employed in the present invention. In other words, the signal conversion technique is also not included in the scope of the present invention. Any suitable analog-to-digital converter can be selectively used in the present invention as necessary without departing from the spirit of the present invention.

The pad section 60 includes two pairs of copper columns 61 each having a fixed end and a free end. The fixed ends of the copper columns 61 are fixedly screwed in an end face of one end of the stator 20. The free ends of the copper columns 61 are spaced from the end face of the end of the stator 20 by a certain distance.

The end seat 70 has an annular fixing section 71 with a certain thickness. The annular fixing section 71 is coaxially fixedly connected to the end face of the end of the stator 20. The end seat 70 further has an annular cover board 72 coaxially outward horizontally extending from a circumference of the fixing section 71. The end seat 70 further has an annular contact wall 73 with a certain height. One end of the contact wall 73 is perpendicularly connected to a rim of the cover board 72, while the other end of the contact wall 73 contacts with a circumference of an end face of one end of the outer rotor seat 31. The cover board 72 is spaced from the end of the rotor 30, whereby the rotor 30 and the cover board 72 define therebetween a hiding space 74.

In the above arrangement, the two circuit boards 51 with collectively arranged signal conversion circuits are symmetrically received in the hiding space 74. The two pairs of fixing lugs 511 of the circuit boards 51 are respectively fixed on the two pairs of copper columns 61 by means of fixing members. Accordingly, the circuit boards 51 are fixed at the end of the stator 20 via the pad section 60. The hiding space 74 serves as a receiving space for receiving the circuit boards 51 therein.

The insulating plates 80 are electrically insulating plates having a configuration corresponding to that of the circuit boards 51. The insulating plates 80 can be fixed on the pad section 60 together with the circuit boards 51 between the circuit boards 51 and the stator 20 and rotor 30. The insulating plates 80 are positioned between the fixed ends and free ends of the copper columns 61. In this embodiment, the insulating plates 80 are selectively fixed between the fixed ends of the copper columns 61 and the end of the stator 20. Alternatively, the insulating plates 80 can be selectively fixed between the free ends of the copper columns 61 and the corresponding circuit boards 51.

According to the hiding structure 10 for the positioning signal conversion mechanism of the torque motor, the signal conversion section 50 is received and hidden inside the torque motor to greatly shorten transmission path of the analog signals. Therefore, the possibility of distortion of the analog signals fed back by the positioning/detecting section 40 due to external affection can be minimized. Therefore, it can be ensured that the analog signals are truly fed back and converted into the digital signals without distortion. In this case, the motor driver will not incorrectly control the torque motor so that the torque motor can precisely operate.

Moreover, by means of the pad section 60, the signal conversion section 50 is spaced from the coils of the stator or rotor by a maximum distance. Also, the insulating plates 80 are disposed in the hiding space 74 to help in preventing electronic operation of the signal conversion section 50 from being affected by magnetization. Therefore, it can be ensured that the signals are real-time and truly converted.

In addition, metal connectors 75 are disposed on the end seat 70 for connecting with an external wire. Accordingly, after the analog signals are converted into the digital signals by the signal conversion section 50, the signals can be directly transmitted to an external motor driver. In this case, the torque motor with the hiding structure 10 for the positioning signal conversion mechanism can be directly compatibly used with any of different models of motor drivers. This greatly enhances practicality and convenience in use of the torque motor.

The above embodiment is only used to illustrate the present invention, not intended to limit the scope thereof. Many modifications of the above embodiment can be made without departing from the spirit of the present invention. For example, the signal conversion section can be fixedly disposed at an end of an outer stator of an inner rotor torque motor. Alternatively, the signal conversion section can be fixedly disposed on a circumference of a stator seat of the outer stator.

What is claimed is:

1. A hiding structure for positioning signal conversion mechanism of a torque motor, comprising:
    a stator having a curvature center line;
    a rotor having a curvature center line coinciding with the curvature center line of the stator, the rotor being coaxially fitted with the stator;
    a positioning/detecting section positioned between the stator and the rotor for detecting movements of the motor and outputting corresponding analog signals;
    a signal conversion section for receiving the analog signals provided by the positioning/detecting section and converting the analog signals into digital signals and outputting the digital signals, said hiding structure being characterized in that the signal conversion section is fixed on an end face of one end of the stator in an insulated state; and
    an end seat fixedly disposed on the end face of the end of the stator, whereby the signal conversion section is positioned between the end seat and the stator;
    wherein the rotor is an outer rotor, an end face of one end of the rotor being spaced from an inner face of the end seat, whereby a hiding space is defined between the rotor and the end seat for receiving the signal conversion section therein.

2. The hiding structure for positioning signal conversion mechanism of the torque motor as claimed in claim 1, further comprising a pad section protruding from the end face of the end of the stator, the signal conversion section being fixedly connected to free end of the pad section and spaced from the end face of the end of the stator.

3. The hiding structure for positioning signal conversion mechanism of the torque motor as claimed in claim 2, wherein the pad section includes multiple copper columns each having a fixed end, the fixed ends of the copper columns being fixedly connected to the stator.

4. The hiding structure for positioning signal conversion mechanism of the torque motor as claimed in claim 1, further comprising an insulating plate positioned between the signal conversion section and the stator.

5. The hiding structure for positioning signal conversion mechanism of the torque motor as claimed in claim 1, further comprising a pad section protruding from the end face of the end of the stator, the signal conversion section being fixedly connected to free end of the pad section and spaced from the end face of the end of the stator and the end face of the end of the rotor.

6. The hiding structure for positioning signal conversion mechanism of the torque motor as claimed in claim 5, further comprising an insulating plate positioned between the signal conversion section and the stator and the rotor.

7. The hiding structure for positioning signal conversion mechanism of the torque motor as claimed in claim 1, wherein the end seat has a fixing section fixedly connected to the end face of the end of the stator, an annular cover board outward extending from a circumference of the fixing section and an annular contact wall perpendicularly connected to a rim of the cover board.

8. The hiding structure for positioning signal conversion mechanism of the torque motor as claimed in claim 7, wherein the fixing section has an annular shape and is coaxial with the cover board.

* * * * *